UNITED STATES PATENT OFFICE.

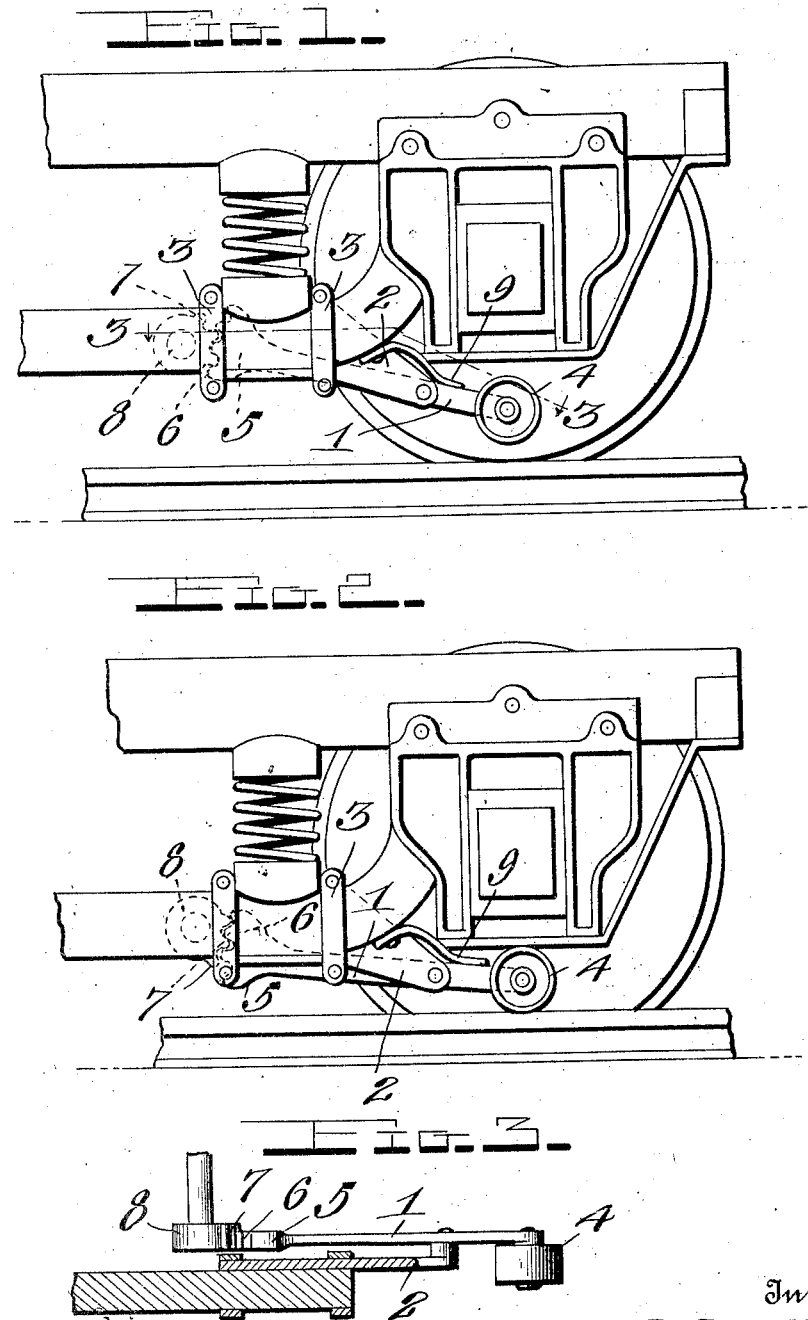

ALBERT HUNTLEY, OF SEBASTOPOL, CALIFORNIA.

EMERGENCY-BRAKE-OPERATING DEVICE.

998,519. Specification of Letters Patent. Patented July 18, 1911.

Application filed November 14, 1910. Serial No. 592,371.

*To all whom it may concern:*

Be it known that I, ALBERT HUNTLEY, a citizen of the United States, residing at Sebastopol, in the county of Sonoma and State of California, have invented certain new and useful Improvements in Emergency-Brake-Operating Devices; and I do declare the following to be a full, clear, and exact description of the invention, such as will enable others skilled in the art to which it appertains to make and use the same.

This invention relates to improvements in emergency brake operating devices for railway cars.

One object of the invention is to provide a brake operating mechanism for steam or electric railway cars whereby should the car become derailed an emergency valve of the air brake apparatus will be opened thus applying the brakes.

Another object is to provide a brake operating device of this character which will be simple, strong and durable in construction, efficient and reliable in operation and which may be applied to any car and air brake apparatus now in use.

With the foregoing and other objects in view, the invention consists of certain novel features of construction, combination and arrangement of parts as will be more fully described and particularly pointed out in the appended claims.

In the accompanying drawings: Figure 1 is a side view partly in section of a portion of a railway car truck and one wheel illustrating the application of the invention, the latter being shown in inoperative position; Fig. 2 is a similar view showing the wheel derailed and the device in operative position to open an emergency valve in the brake apparatus; Fig. 3 is a horizontal sectional view on the line 3—3 of Fig. 1.

In the embodiment of the invention I provide a lever 1 which is arranged in suitable position adjacent to the outer side of the wheel and is pivotally secured intermediate its ends to a bracket 2 which is clamped to the equalizer bar or other suitable part of the car truck by clips 3 or similar fastening devices as shown.

The lever 1 is preferably arranged at an angle and in the lower end thereof is revolubly mounted a track engaging wheel 4, which is disposed in such position and at such distance above the track that when the car wheel leaves the track the wheel 4 will be brought into engagement therewith thereby rocking the lever 1 on its pivotal connection with the bracket 2.

On the upper end of the lever is formed a head 5 having thereon a series of gear teeth 6 which are adapted to engage similar teeth 7 formed on the stem or other operating element 8 of an emergency valve arranged in one of the pipes of the air brake apparatus whereby the air is released and the brakes applied. A stiff spring 9 is adapted to hold the lever 1 in position when not in use.

In practice at least two of my improved operating devices are employed on each truck and at the opposite sides of the same adjacent to the side of the wheels.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. An emergency valve-operating mechanism for air brakes comprising in combination with a car truck, a bracket secured to and projecting from the truck, a lever pivoted to said bracket, a rail engaging wheel carried by the latter and having one end projecting beyond the bracket in position to impinge upon the track rail should the truck leave the track, a valve operating device engaged by the opposite end of the lever, and a spring bearing upon the lever to hold the free end thereof normally depressed.

2. An emergency valve operating mechanism for the air brake apparatus of railway cars comprising a suitably mounted lever, a track engaging wheel carried by said lever and adapted to be operatively engaged with the railway track when the car wheels are derailed, a head on the opposite end of said lever, a series of gear teeth formed on said head, and a valve operating element having a series of gear teeth adapted to be engaged by the toothed head of said lever whereby when the car wheel is derailed and the wheel
5 on the lever engaged with the track said valve will be opened.

In testimony whereof I have hereunto set my hand in presence of two subscribing witnesses.

ALBERT HUNTLEY.

Witnesses:
A. B. SWAIN,
DORA BOYD.